United States Patent [19]

Cooke

[11] Patent Number: 5,505,000
[45] Date of Patent: Apr. 9, 1996

[54] BATTERY POWERED LASER AND MOUNT SYSTEM

[75] Inventor: Claude R. Cooke, Auburn, Calif.

[73] Assignee: Hein-Werner Corporation, Waukesha, Wis.

[21] Appl. No.: 298,137

[22] Filed: Aug. 30, 1994

[51] Int. Cl.$^6$ .................................................. G01C 5/00
[52] U.S. Cl. ........................ 33/286; 33/288; 33/DIG. 21
[58] Field of Search ........................... 33/286, 227, 281,
33/282, 285, 287, 288, DIG. 21

[56] References Cited

U.S. PATENT DOCUMENTS

| 4,330,945 | 5/1982 | Eck | 33/288 |
|---|---|---|---|
| 4,338,027 | 6/1982 | Eck | 356/155 |
| 4,454,659 | 6/1984 | Eck | 33/288 |
| 4,513,508 | 4/1985 | Jarman et al. | 33/288 |
| 4,578,870 | 4/1986 | Cooke | 33/288 |
| 4,630,379 | 12/1986 | Wickman et al. | 33/288 |
| 4,679,447 | 7/1987 | Sieradzki et al. | 33/550 |
| 4,752,126 | 6/1988 | Fujii | 33/285 |
| 5,355,609 | 10/1994 | Schenke | 33/DIG. 21 |
| 5,367,779 | 11/1994 | Lee | 33/DIG. 21 |
| 5,394,616 | 3/1995 | Claxton | 33/DIG. 21 |
| 5,400,514 | 3/1995 | Imbrie et al. | 33/286 |

Primary Examiner—Christopher W. Fulton
Attorney, Agent, or Firm—James A. Wilke

[57] ABSTRACT

A laser and laser mount system for a vehicle measurement system wherein the laser is powered by a direct current source, such as a battery, and the laser is mounted on the same axis as its rotational pivot axis which provides for up to 360° of rotation of the laser about such axis.

7 Claims, 2 Drawing Sheets

BATTERY POWERED LASER AND MOUNT SYSTEM

FIELD OF INVENTION

The present invention relates to a laser generated beam projector and in particular to a battery powered laser beam projector for use in a vehicle measurement system.

BACKGROUND OF THE INVENTION

The use of laser generated beam projectors in vehicle measurement systems has been known. Devices, such as this Assignee's LAZER ALIGNER (TM) marketed by Kansas Jack Division of Hain-Werner Corporation, are disclosed in several measurement system patents such as U.S. Pat. Nos. 4,330,945, 4,338,027 and 4,454,659 (all assigned to Hein-Werner Corporation). The use of such laser projector in a measurement system was further refined by this Applicant's U.S. Pat. No. 4,578,870 for a selectible beam/plane projecting laser. Such laser is also used by this Assignee in the above mentioned LAZER ALIGNER (TM) and related products.

In all of the above mentioned products, the laser projector is powered by an alternating current with a power cord connection from the laser projector to a convenient power outlet. The laser projector, because of its size to accomodate the alternating current technology, cannot pivot 360° about its mounting axis. The power cord causes an obstruction. This requires an operator of a vehicle measuring system to dismount the laser projector, rotate the laser projector 180° and remount the laser projector to the measuring system support member during the measurement of a vehicle's front and back ends as disclosed in Eck U.S. Pat. Nos. 4,330,945 and 4,454,659. Such removal and remounting of the laser projector necessitates a recalibration and realignment of the laser projector with respect to the vehicle measurement datum plane. That operation potentially introduces errors into the measurement procedure as well as adds time and inefficiencies to the vehicle measurement procedure.

Another problem with the prior art laser projector is the size and weight of the unit. The units are bulky and heavy resulting in mounting support members to be of sufficient size and strength to support such laser projector units. Such requirements add costs and inefficiencies to the overall measurement system.

An additional problem with the prior art laser measurement system is that the mounting of the laser on the support member is not on the same axis as the pivot point of the mounting support. The size and weight of the lazer projector as well as the power cord connection contribute to this off-axis condition. Such condition limits the effective range of use of the laser projector and usually requires a realignment and recalibration of the laser projector to the vehicle datum plane.

SUMMARY OF THE INVENTION

The present invention advantageously provides a laser and laser mount system for a vehicle measurement system that is light weight and durable. The laser is powered by a direct current source, such as a battery and the laser is mounted on the same axis as its rotational pivot axis which allows for up to 360° rotation about such axis. However, as will be described below, the preferred embodiment provides a stop to limit repeated rotations about the pivot axis.

One embodiment of the present invention comprises a mounting bracket, a thrust bearing mounted on the mounting bracket, a laser module mounted on the thrust bearing with the laser energy projecting at a right angle to the axis of rotation of the laser mounted on the thrust bearing and an electronic box having the electronic control members connected to the laser and the direct current source.

A primary advantage of the present invention is the use of a direct current power source for a battery powered diode laser module.

Another primary objective of the present invention is to have the laser module mounted on its axis of rotation on the mounting bracket up to a full 360° of rotation without necessitating removal of the laser module from the mounting bracket or from the measuring system support member.

A principal feature of the present invention is to provide a laser module mount system that supports a battery storage housing connected to the laser module, which battery storage housing will accommodate any type of battery such as re-chargeable batteries or non-rechargeable batteries. One embodiment of the present invention comprises the battery housing integral with the laser housing.

Other principal features and advantages of the invention will become apparent to those skilled in the art upon review of the following drawings, the detailed description and the appended claims.

Figure 1:
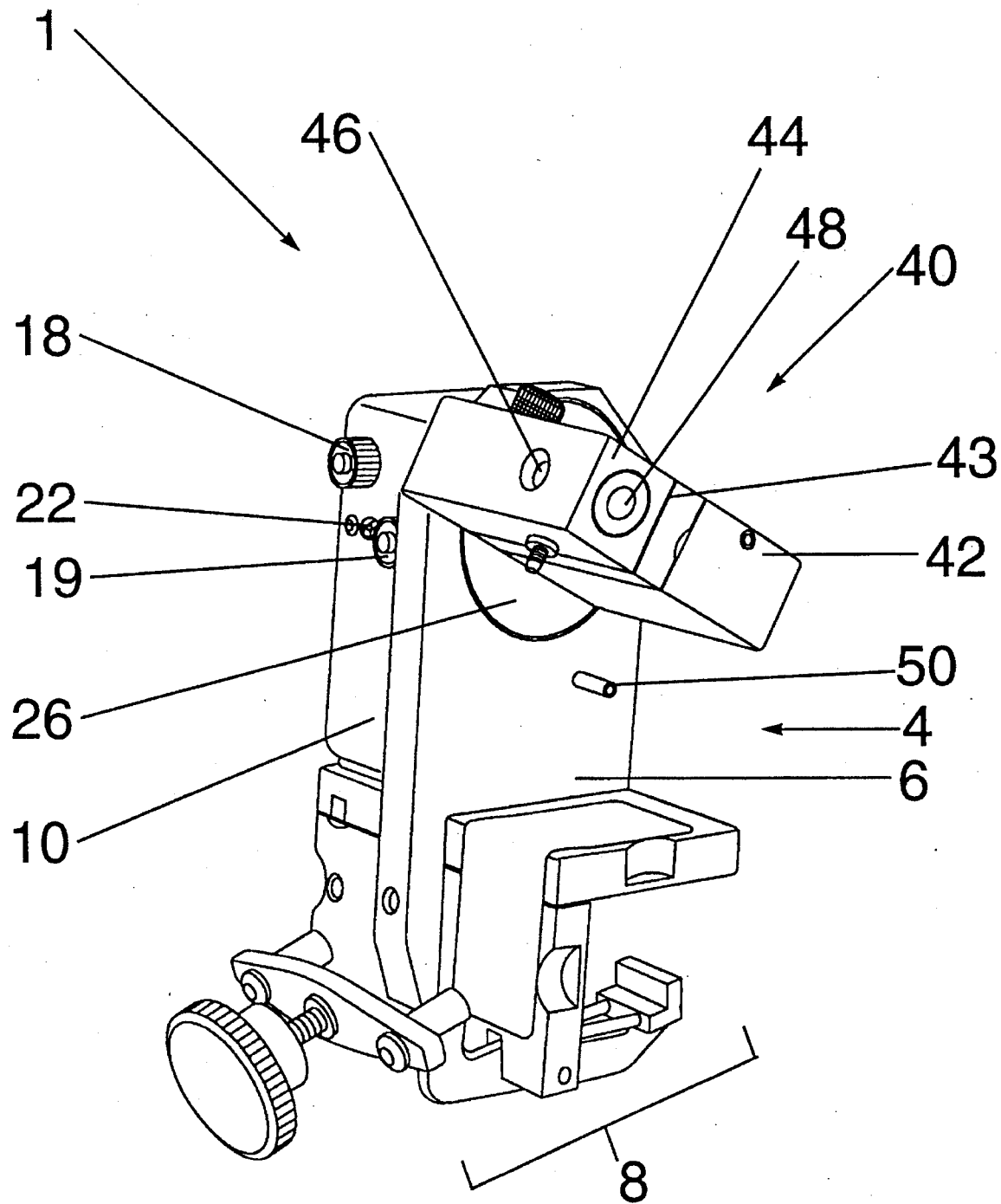
FIG. 1 is a perspective illustration of the battery powered laser on a mounting support.

Although only one embodiment of the invention is explained in detail, it is to be understood that the invention is not limited in its application to the details of construction and the arrangement of components set forth in the following description or illustrated in the drawings. The invention is capable of other embodiments and of being practical or carried out in various ways. Also, it is to be understood that the phraseology and terminology used herein is for the purpose of description and should not be regarded as limiting.

DETAILED DESCRIPTION OF THE PREFERRED EMBODIMENT

Figure 2:
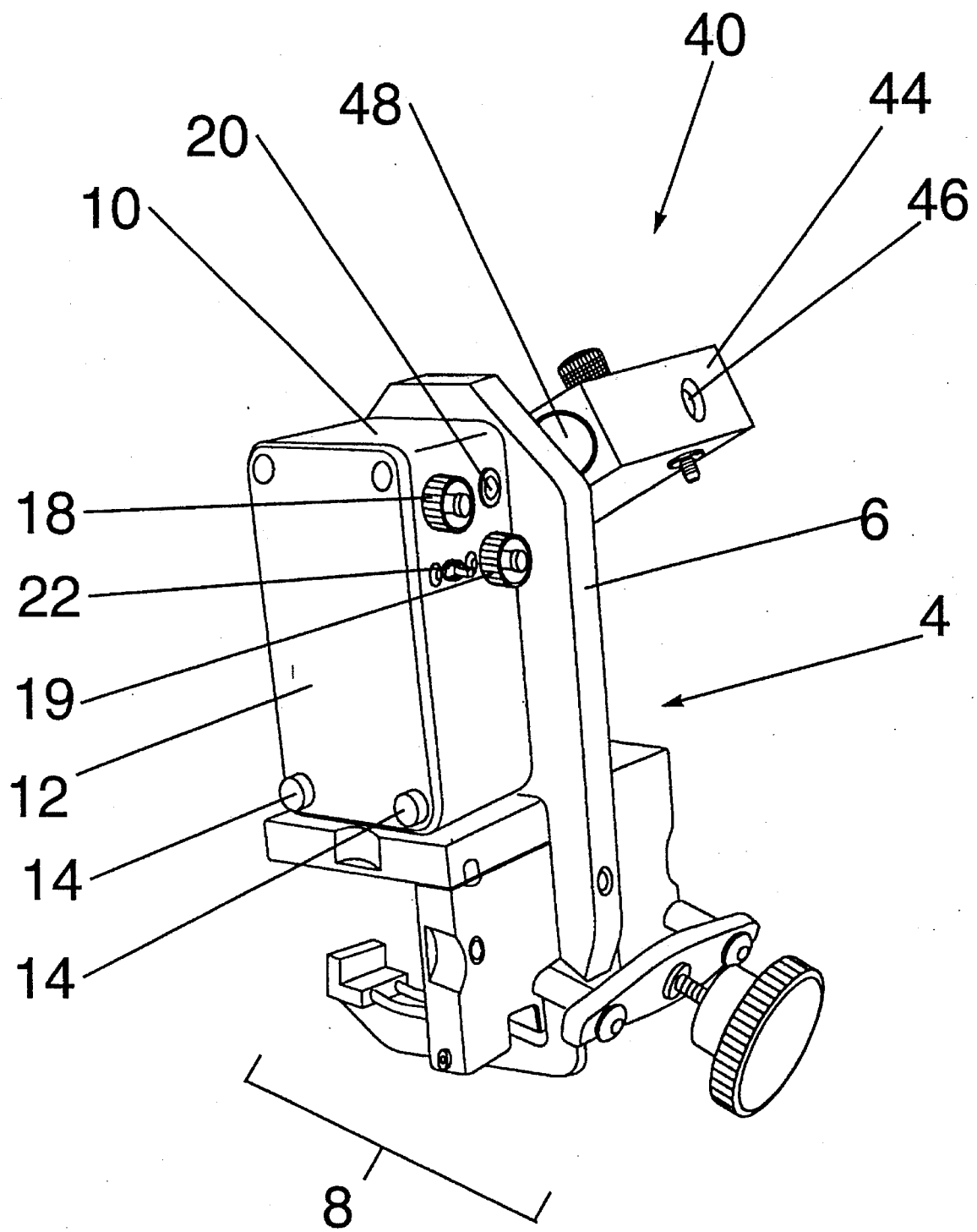
FIG. 2 is a perspective illustration of the battery powered laser on a thrust bearing attached on a mounting support rotated 90° from the view shown in FIG. 1.

FIG. 1 and FIG. 2 illustrate a laser mount 1 for a vehicle measurement system which includes a selectible beam/plane laser projector 40. The selectible beam/plane laser projector includes a solid state diode laser as well as a switch module disclosed in U.S. Pat. No. 4,578,870 by this Applicant and used by this Assignee in the alignment apparatus disclosed in U.S. Pat. Nos. 4,330,945 and 4,454,659 which are incorporated herein by this reference. The present invention removably attaches to the measurement scale carrier and bar disclosed in such patents.

The laser mount 1 includes a mounting bracket 4 comprising a support member 6 and a clamp 8. The support member 6 is typically perpendicular to the clamp 8. The clamp 8 is suitable for removably attaching the laser mount 1 to various vehicle measuring systems well known in the art. The preferred embodiment for the clamp 8 includes adjustment devices to align the clamp 8 on the measuring carrier and bar in relationship to a datum plane associated with a vehicle being measured. The support member 6 is generally in an upright aspect with respect to the clamp 8 and is of sufficient strength and durability to support and sustain other elements of the present invention. The preferred embodiment provides an aluminum support member 6. The support member 6 is typically an elongated member having one end attached to the clamp 8 and its distal end supporting a thrust bearing assembly 26 to which is attached the electronic box 10 and the laser projector 40.

The thrust bearing assembly 26 includes a conventional hollow shaft of suitable length extending through the support member 6. The laser projector 40 is mounted on the thrust bearing assembly 26 and is in communication with the hollow shaft. An electronic box 10 is mounted on the support member 6 opposite the laser projector 40 and in communication with the hollow shaft. Wiring (not shown) between electronic components within the electronic box 10 and the laser projector 40 are contained within the hollow shaft.

The electronic box 10 and electronic box cover 12 are of conventional construction and support various electric and mechanical elements associated with the laser mount 1. Typical electric and mechanical elements include an on/off switch 18, an indicator 20, and a continuous/intermittent switch 22. Such elements control the various functions of the laser projector 40 during the use of the present invention in the vehicle measurement procedure. The electronic box 10 also contains the associated electronic control circuit board, battery and battery holder for powering the laser projector 40 and the functioning of the laser mount 1. Such functions include on and off for the entire laser system with an indicator, such as an LED, to represent On when the LED is energized. This Applicant also has utilized a conventional timing circuit, activated by a switch 22, that provides a continuous mode of power to the laser projector 40 and an intermittent mode of power to the laser for a selectible time period, such as twenty minutes, before terminating power to the laser. The latter mode conserves battery power, especially if the operator of the vehicle alignment system forgets to shut the laser off for any reason.

The electronic box 10 also contains the battery and battery holder. Such holder is well known in the art and is sized to conveniently hold sufficient batteries to power the laser and its supporting circuitry. This Applicant has found that four "AA" size batteries is a suitable size and number to power the present invention for a convenient time period to perform the necessary measurements. This Applicant has used renewable alkaline batteries, conventional alkaline batteries as well as nickel/cadmium both single use and renewable types.

The wiring between the various electronic control members and the batteries, as necessary, is routed from the electronic box 10, through the hollow shaft in the support member 6 and into the laser projector 40.

The laser projector 40, as mentioned, is mounted to the thrust bearing assembly 26 in a convenient manner, such as with machine screws. The thrust bearing 26 allows the laser projector 40 to rotate about the central axis of the thrust bearing 26. The laser projector 40 includes a housing 42 having a front wall 43 and an aperture 46 attached to the housing. At the front wall is a switch module 44, which contains a shiftable module 48. The shiftable module 48 uses this Applicant's selectible beam/plane lensing system described in U.S. Pat. No. 4,578,870 incorporated herein by this reference. The housing 42 also contains a laser, laser cradle and the laser driver circuit. The laser in the present invention is a solid state laser diode unit powered by a direct current source. One alternative embodiment provides a selectible focus lens mounted in the housing 42 between the laser and the aperture 46 within the path of laser light energy. Such selectible focus lens is well known in the art and is of conventional size and construction. The focus ability allows the size of the laser light energy to be controlled at a given distance. Such focus ability is important in the vehicle measurement system and is unique, with the present invention, in the art. The wiring used to supply the power for the laser and its driver circuit is routed to the laser projector 40 housing 42 through the hollow shaft supporting the thrust bearing 26. Although the laser projector, as attached to the thrust bearing assembly, may rotate up to a full 360°, the Applicant retards such rotation by mounting a stop 50 to the support member 6 in the path of rotation of the laser projector 40. Such stop 50 limits rotation to approximately 310° and prevents the wiring in the hollow tube from twisting and eventually breaking as a result of the laser projector rotation.

An alternative embodiment provides that the various electronic control members, the batteries and associated wiring are mounted in the laser projector housing 42. Such arrangement eliminates the routing of wires through the hollow shaft and the resulting wire twist.

The shiftable module 48 in the switch module 44 uses the switching mechanism for changing the beam of light emitted by the laser to a plane of light as disclosed in this Applicant's U.S. Pat. No. 4,578,870 incorporated herein.

In operation the laser mount 1 is utilized with this Assignee's U.S. Pat. Nos. 4,330,945 and 4,454,659, incorporated herein. Specifically, the present invention is mounted on the measurement scale carriers disclosed in '945 or measurement bar disclosed in '659. However, the advantage of the present invention is that the laser projector 40 rotates, at least 180°, around the central axis of the thrust bearing assembly 26 without need for realignment or recalibration of the laser projector 40. Measurements can be made at the front, rear or upper body portion of a vehicle without removing the laser mount 1 of the present invention.

Thus, it should be apparent that there has been provided in accordance with the present invention a laser mount for a vehicle measurement system that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

I claim:

1. A selectible beam/plane laser projector for vehicle measuring system comprising:

a support member removably attached to the vehicle measuring system and said support member having a thrust bearing assembly rotatable in a plane coincident with the support member, a housing with a front wall having an aperture, with said housing mounted on the thrust bearing so the aperture is perpendicular to the thrust bearing, a laser energy projecting element mounted in said housing and aligned with the aperture for directing a beam of laser energy through the aperture, a switch module mounted on the front wall of the housing and aligned with the aperture, with the switch module having a shiftable member supporting a lens movable into the path of said beam to cause said beam to project in a plane, and an electronic box having electronic control member connected to the laser energy projecting element with said electronic box mounted on the mounting bracket.

2. The selectible beam/plane laser projector of claim 1 wherein the laser energy projecting element is powered by a direct current source from a group consisting of alkaline, renewable alkaline, nickel/cadmium, and renewable nickel/cadmium batteries.

3. The selectible beam/plane laser projector of claim 1 including a selectible focus lens mounted between the laser energy projecting element and the aperture.

4. The selectible beam/plane laser projector of claim 2 wherein the direct current source and electronic control member are mounted in the housing.

5. A laser mount of a vehicle measurement system, with said measurement system having support members and target members, said laser mount comprising:

a laser projector, an electronic control circuit, a battery electrically connected to the laser projector and the control circuit, an electronic box to house the laser projector, the control circuit and the battery, and a mounting bracket adapted to support the laser projector, the control circuit, the battery and the electronic box, with said mounting bracket adapted to engage the support members of the vehicle measurement system and align light energy of the laser projector with selected target members of the vehicle measurement system.

6. The laser mount of claim 5 wherein the mounting bracket includes a thrust bearing having a central axis, with said thrust bearing adapted to engage the laser projector and provide for rotational movement of the laser projector around the central axis.

7. The laser mount of claim 6 wherein the rotational movement of the laser projector is defined within a 310° arc about the central axis of the thrust bearing.

* * * * *